Figure 7:
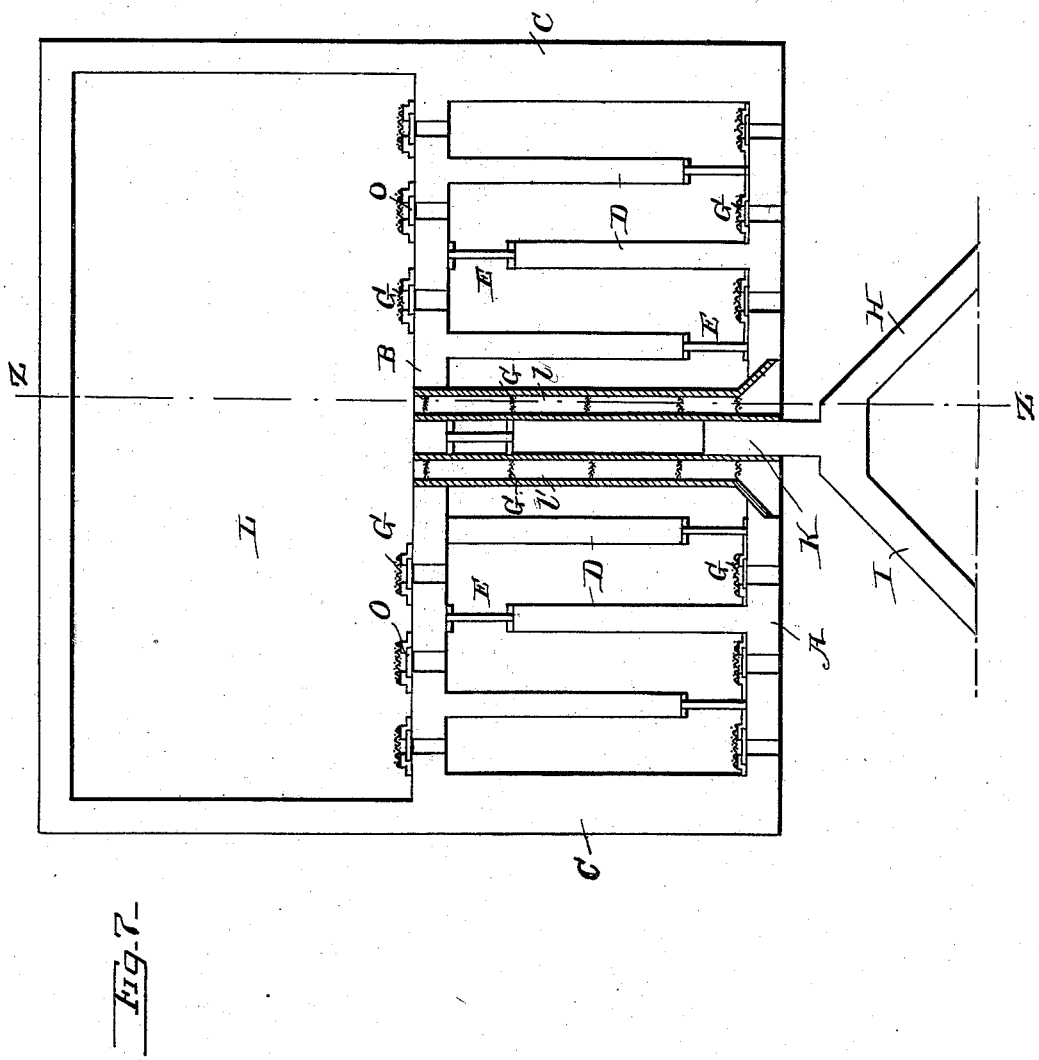

(No Model.)  8 Sheets—Sheet 1.
D. H. HIBBERT.
OYSTER BED.
No. 535,136. Patented Mar. 5, 1895.
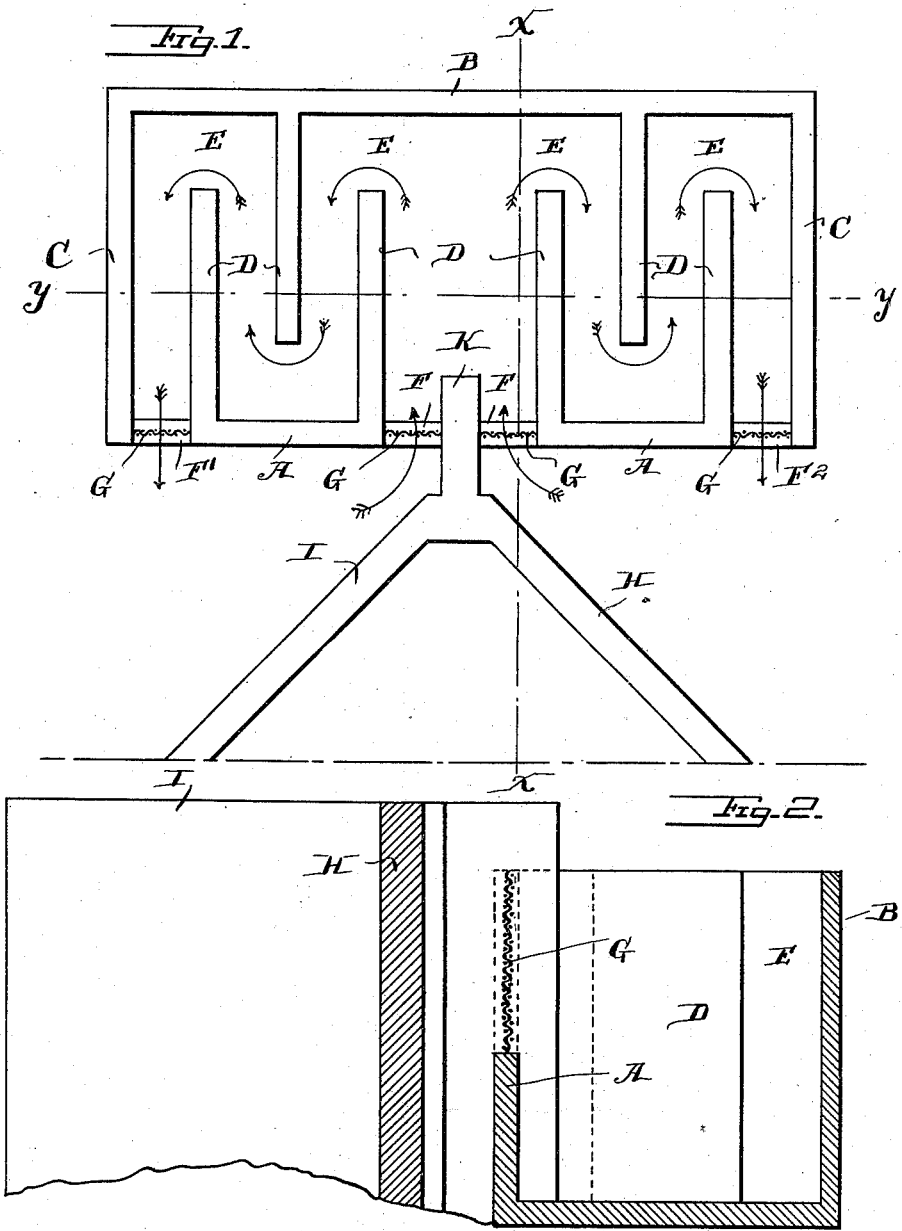
Witnesses.
Jesse B. Heller
Frank S. Busser
Inventor.
Decatur H. Hibbert
G. Harding
Attorney.

(No Model.)   8 Sheets—Sheet 2.
D. H. HIBBERT.
OYSTER BED.
No. 535,136.   Patented Mar. 5, 1895.
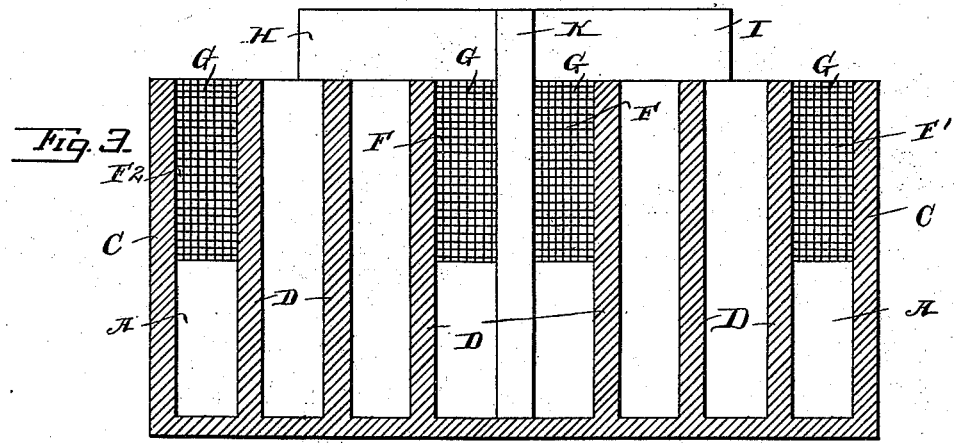
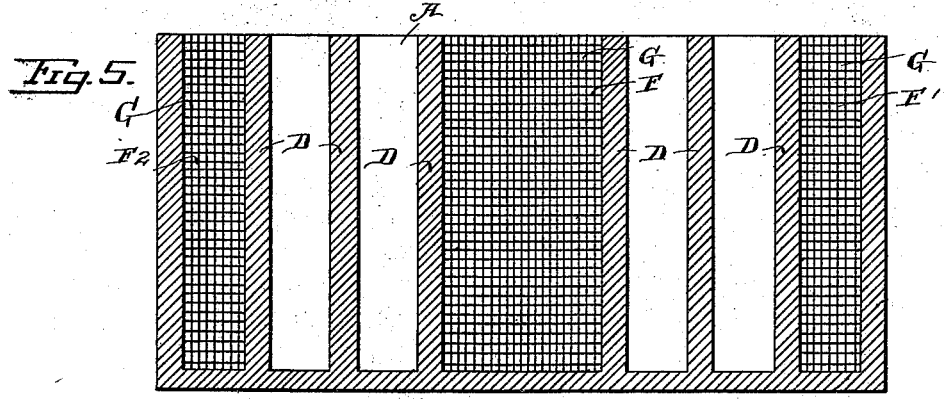
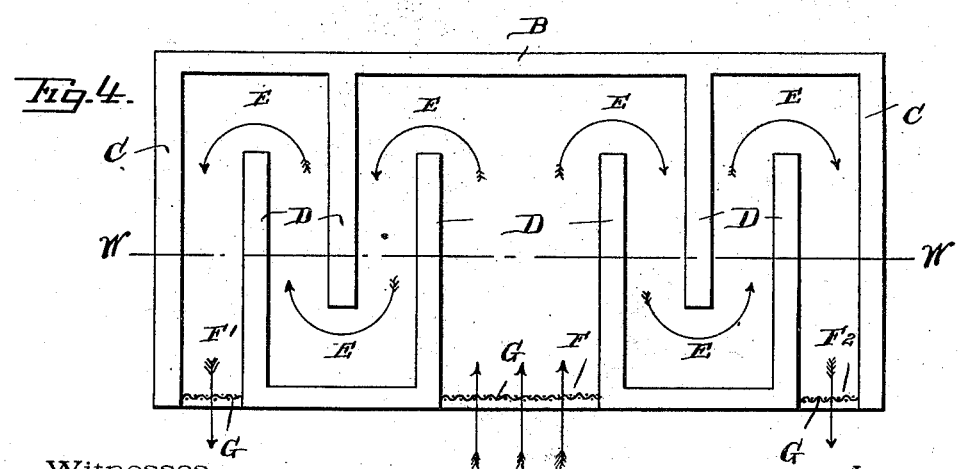
Witnesses.   Inventor.

(No Model.)
D. H. HIBBERT.
OYSTER BED.
No. 535,136.
8 Sheets—Sheet 3.
Patented Mar. 5, 1895.
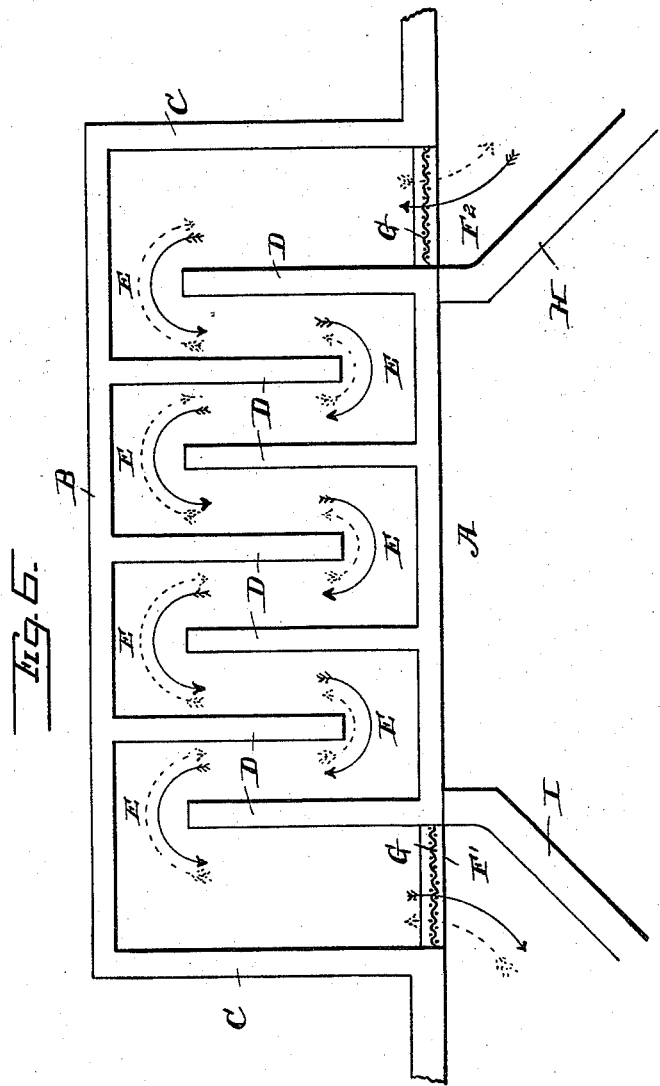

(No Model.) 8 Sheets—Sheet 4.
D. H. HIBBERT.
OYSTER BED.

No. 535,136. Patented Mar. 5, 1895.

Witnesses.
Jesse B. Heller.
Frank S. Busser

Inventor.
Decatur H. Hibbert
by G. I. Harding
Attorney.

(No Model.) 8 Sheets—Sheet 5.
D. H. HIBBERT.
OYSTER BED.

No. 535,136. Patented Mar. 5, 1895.

Witnesses.
Jesse B. Heller.
Frank S. Busser

Inventor.
Decatur H. Hibbert

Attorney.

(No Model.)  8 Sheets—Sheet 6.
D. H. HIBBERT.
OYSTER BED.
No. 535,136. Patented Mar. 5, 1895.
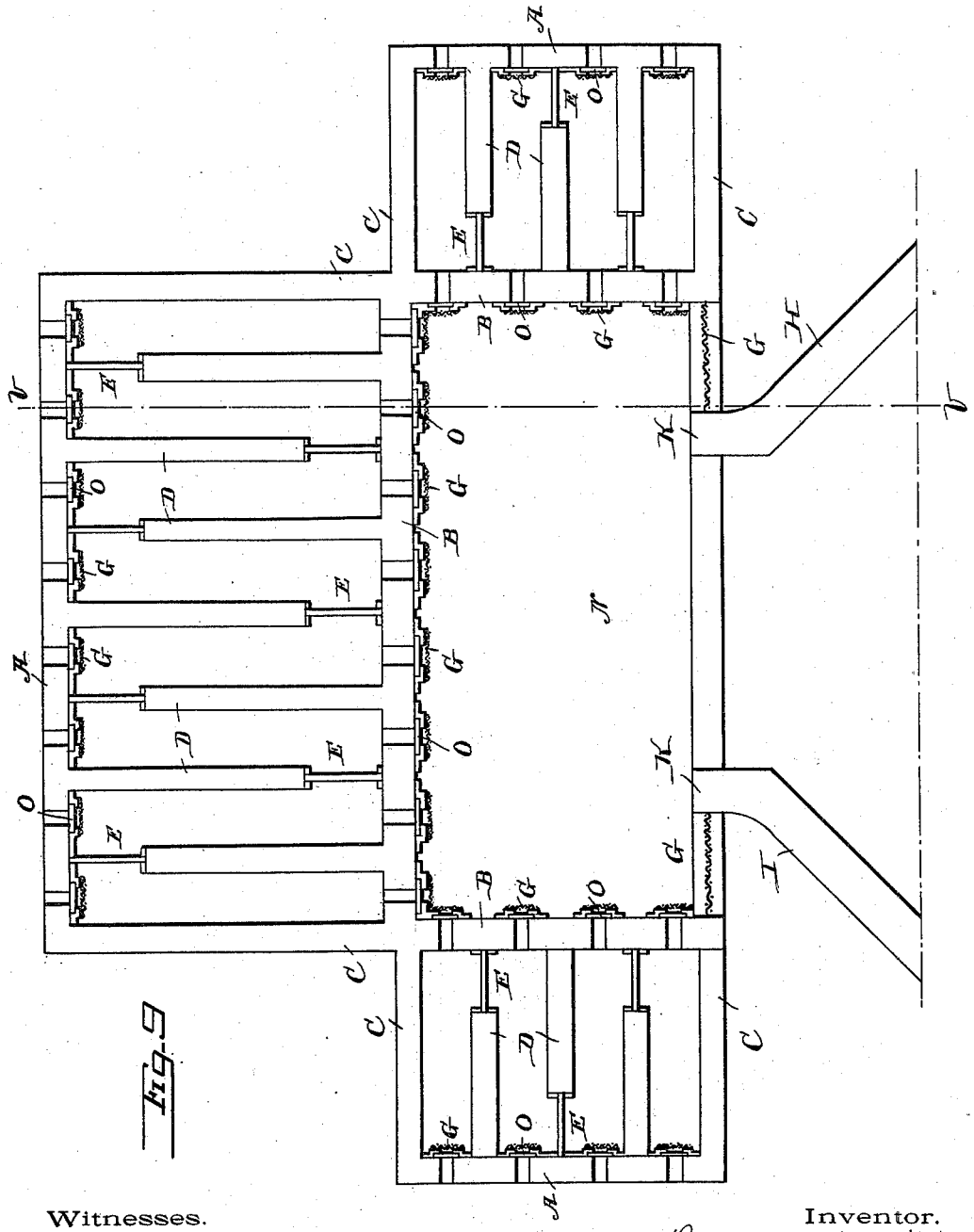
Witnesses.
Jesse B. Heller.
Frank S. Busser
Inventor.
Decatur H. Hibbert
J. G. Harding
Attorney.

(No Model.) 8 Sheets—Sheet 7.
D. H. HIBBERT.
OYSTER BED.
No. 535,136. Patented Mar. 5, 1895.
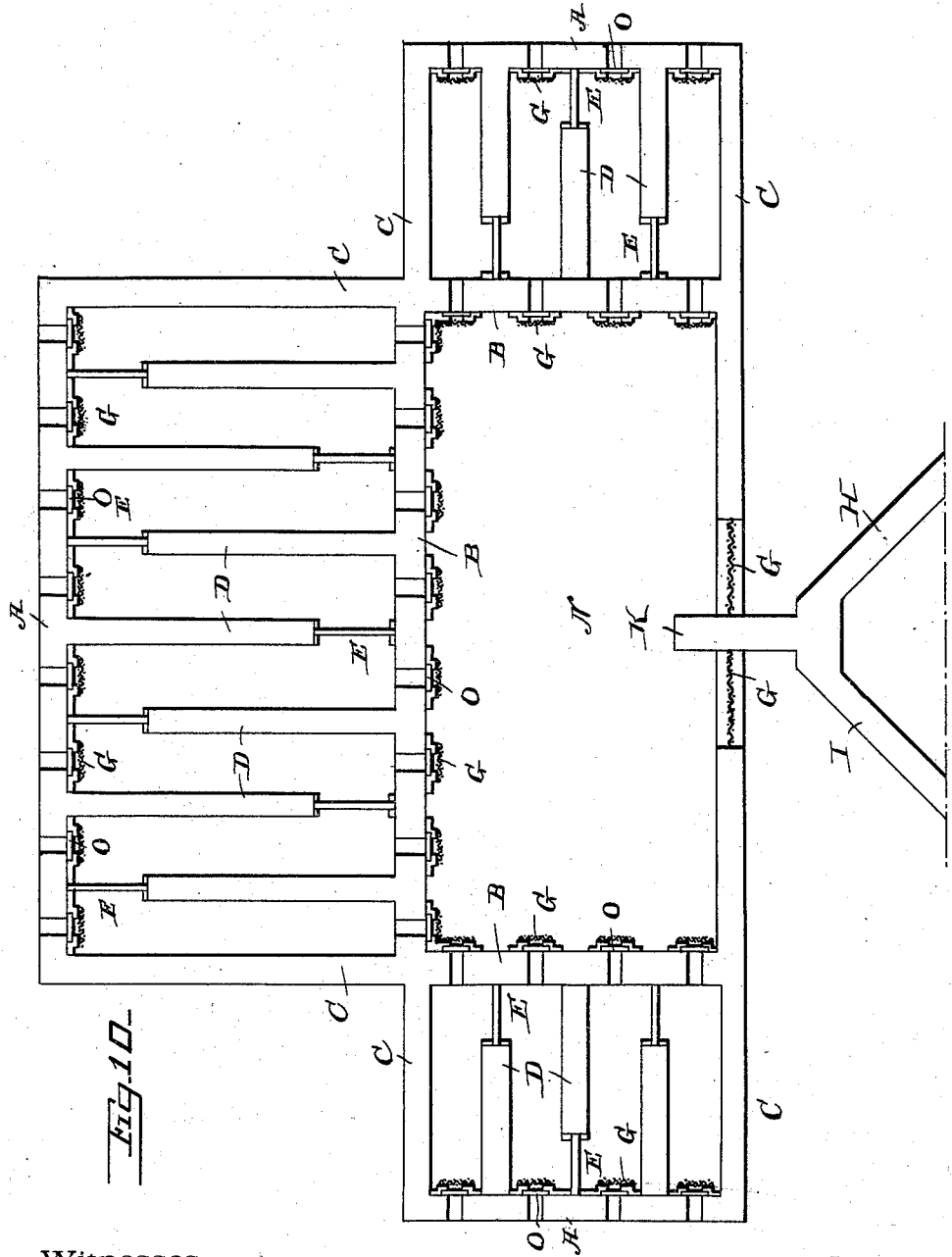
Witnesses. Inventor.
Attorney.

(No Model.) 8 Sheets—Sheet 8.
D. H. HIBBERT.
OYSTER BED.
No. 535,136. Patented Mar. 5, 1895.
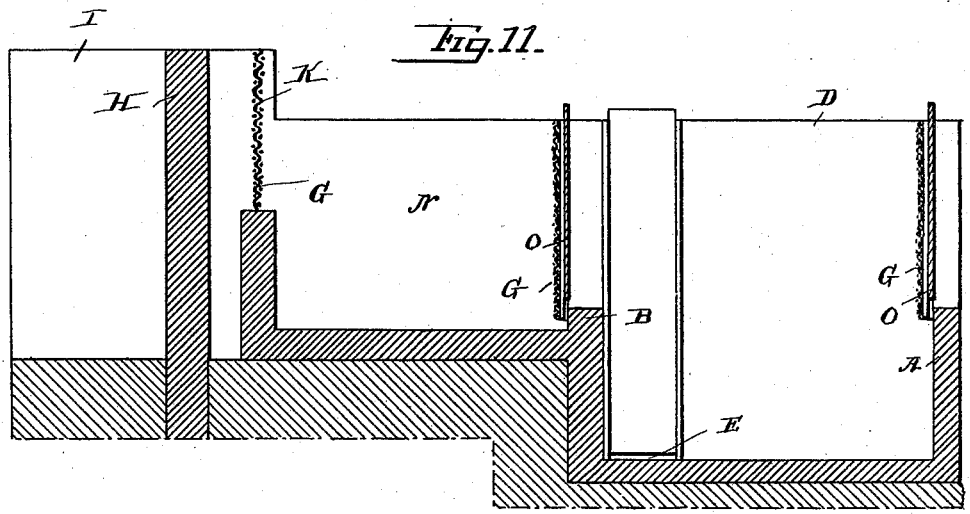
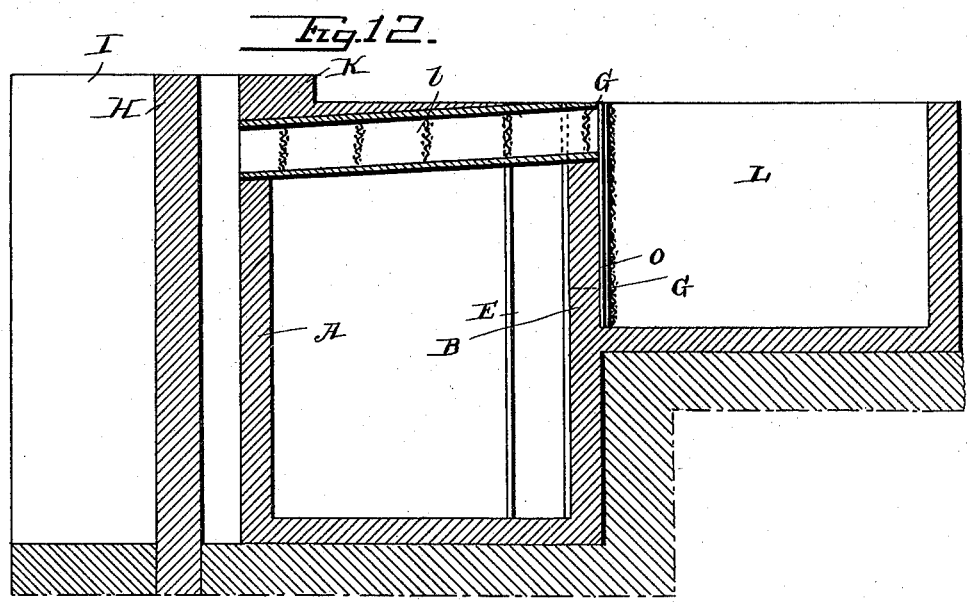
Witnesses.
Jess B. Heller
Frank S. Busser
Inventor.
Decatur H. Hibbert
by J. H. Harding
Attorney.
THE NORRIS PETERS CO., PHOTO-LITHO., WASHINGTON, D. C.

United States Patent Office.

DECATUR H. HIBBERT, OF PHILADELPHIA, PENNSYLVANIA.

OYSTER-BED.

SPECIFICATION forming part of Letters Patent No. 535,136, dated March 5, 1895.

Application filed October 18, 1894. Serial No. 526,238. (No model.)

*To all whom it may concern:*

Be it known that I, DECATUR H. HIBBERT, a citizen of the United States, residing at Philadelphia, county of Philadelphia and State of Pennsylvania, have invented a new and useful Improvement in Oyster-Beds, of which the following is a full, clear, and exact description, reference being had to the accompanying drawings, which form a part of this specification.

I will first describe my invention as illustrated in the drawings and then particularly point out the invention in the claims.

Figure 8:
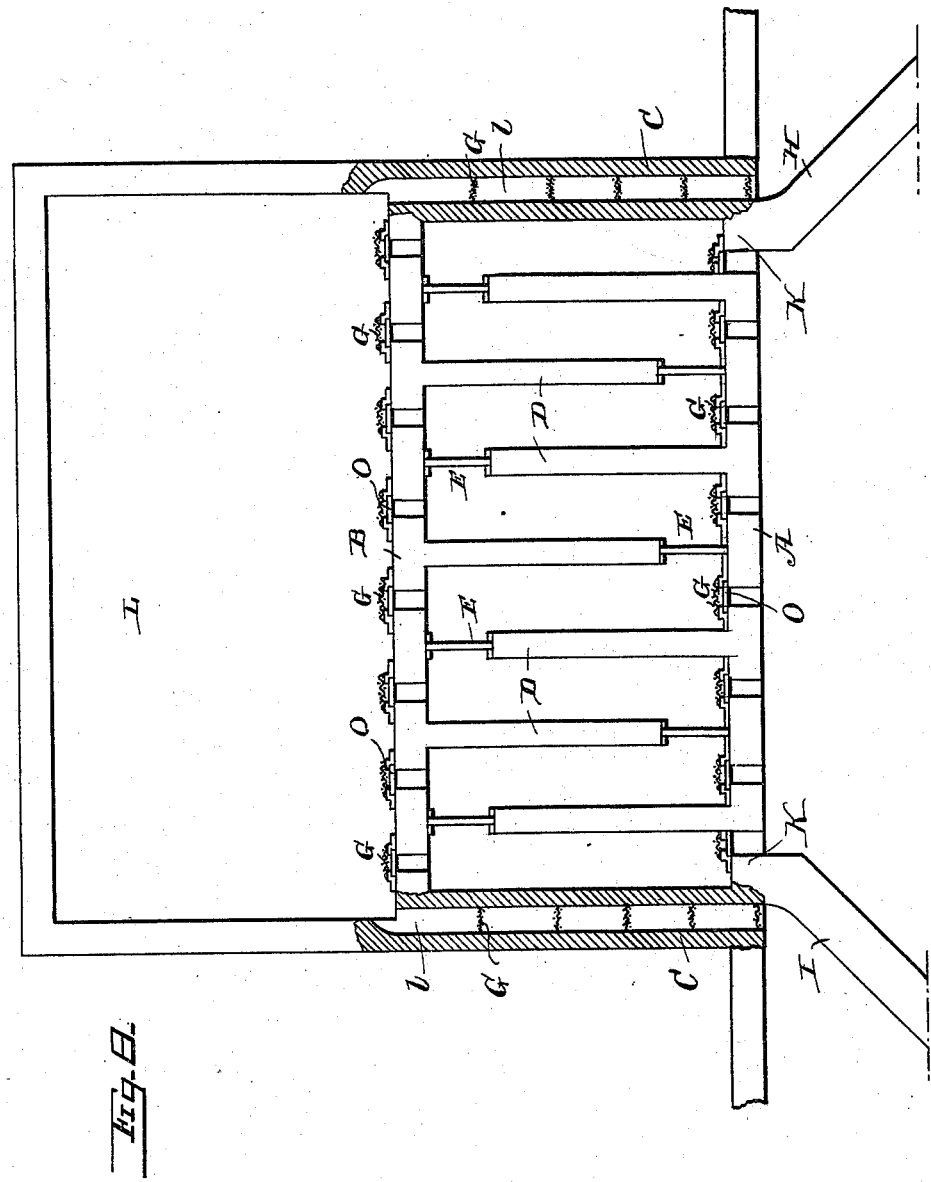

In the drawings:—Figure 1 is a plan view. Fig. 2 is a section on the line $x-x$, Fig. 1. Fig. 3 is a section on the line $y-y$, Fig. 1. Fig. 4 is a plan view of modified form. Fig. 5 is a section on the line $w-w$, Fig. 4. Fig. 6 is a plan view of modified form. Fig. 7 is a plan view of modified form partially in section. Fig. 8 is a plan view of modified form partially in section. Fig. 9 is a plan view of modified form. Fig. 10 is a plan view of modified form. Fig. 11 is a section on the line $v-v$, Fig. 9. Fig. 12 is a section on the line $z-z$, Fig. 7.

In carrying out my invention, I select a proper place, preferably contiguous to tide water and in marshy land. I first form my bottom either with sand, gravel, rock, pile or cement; or, preferably, I lay down wooden planks and over them lay a coat of cement, which, as the wood rots, will leave a cement bottom. Over this I place a layer of soil, such as is adapted for oyster culture. I arrange between this bottom, (which I will call the bed) and the contiguous water, a wall, A, which is raised to a height greater than the height of the adjacent water at high tide; and opposite to it I construct the wall B, of the same height as wall A, and at each end the walls C, also of the same height, and thus form what might be called a tank. Between the walls C, I arrange a series of lateral walls, K. These walls are of the same height as walls C, but do not extend across the whole width of the tank, but project alternately from opposite sides A and B, and extend a distance leaving an open space E, between the end and the wall opposite to that from which it started. The wall A is provided with portions, F', F², lower than the remainder of the wall but higher than the contiguous water at high tide under normal conditions, and above these depressed portions I place the screens G. H and I are two wings, which point in opposite directions and each extend toward a dam K, which projects to and beyond the depressed portions F' and F², and above the level of the wall A. (See Fig. 6.) This construction is for use in tide water where the water moving in one direction by the action of the tide is forced against the wing H or I, backed up in a narrow space against the dam K, which causes it to rise and pour over the wall A at portion F' of F², dependent upon the direction of the tide, through the screen G into the tank or bed.

Instead of using a wing at each end of the bed, I can use four depressed portions, F F, F', F², the portions F F having the wings H, I, projecting in opposite directions and converging to the dam K. (See Fig. 1.) Dependent upon the direction of the tide, the water strikes either the wing H or I, is backed up against the dam, and pours over one of the depressed portions F, passing out by the depressed portions, F', F², all of them being provided with screens G.

In using the bed in connection with tide water having a great tidal change, I use the construction shown in Figs. 7 and 8, in which I use a secondary or storage reservoir, L, and pipes $l$, $l'$, provided with screens, lead to this reservoir. The wings H and I are as above described, except instead of connecting with the bed they connect with the pipes $l$, $l'$, which are provided with screens $f^4$. From the reservoir L, gates O, O, &c., provided with screens, lead to the oyster bed. These outlets are also provided with screens. These wings may be at the end, as in Fig. 8, or centrally disposed as in Fig. 7.

The staggered walls D cause the water to assume a regular movement in passing over or through the bed. The screens prevent the passage of foreign matter or anything hurtful to the growth or propagation of the oysters.

If, instead of forming my bed in tide water, I form it in or at a stream in which the current flows constantly in one direction, I remove the wall A at the points F F, F', F², and replace it at those points with screens, G, and arrange the bed at such an angle with the current that there will be a constant passage of water through the inlet and out of the outlets.

In order that my invention may be carried out, it is not necessary that the dam and inlet shall occupy a central position relative to the tank. They may on the contrary, be located at one end, so that the water will flow through the tank in but one direction; or they may be located at both ends of the tank; or they may be located at any point along the side of the tank; and I do not wish to limit myself to any particular construction except wherein such construction is particularly claimed. I can also if desired use a central reservoir as N provided with surrounding oyster beds, and the reservoir being provided with gates and screens adapted to admit water to the various beds, as shown in Figs. 9 and 10.

Having now fully described my invention, what I claim, and desire to protect by Letters Patent, is—

1. The combination with an oyster bed having outer walls, of a wing, without but contiguous to one of said walls and extending diagonally from it, for collecting the water.

2. The combination with an oyster bed having outer walls and provided with interior or staggered walls, of a wing, without but contiguous to one of said walls, for collecting the water.

3. The combination with an oyster bed having outer walls and provided with interior or staggered walls, of wings, without but contiguous to one of said walls, extending in opposite directions and against one of which the water in the movement of the tide in either direction will strike.

4. The combination with an oyster bed having outer walls, and provided with an inlet and outlet, of a wing, extending diagonally from one of said walls and contiguous to said inlet, for collecting the water.

5. The combination with an oyster bed having outer walls, of wings extending in different directions and against one of which the water in the movement of the tide in either direction will strike there being for each of said wings an inlet in said wall adapted to receive the water collected by said wing.

6. The combination with an oyster bed having outer walls and provided with interior or staggered walls, of wings extending in different directions, and against one of which the water in the movement of the tide in either direction will strike, and a dam toward which said wings converge, located between the converging ends of said wings and the wall there being for each of said wings an inlet in said wall adapted to receive the water collected by said wing.

7. The combination with an oyster bed having outer walls the crest of which is higher than the water at high tide, and provided with interior staggered walls, of wings extending in different directions and against one of which the water in the movement of the tide in either direction, will strike, a dam toward which said wings converge, located between the converging ends of said wings and the wall, the crest of said dam being higher than the top of the wall adjacent to the water there being for each of said wings an inlet in said wall adapted to receive the water collected by said wing.

8. The combination with an oyster bed adjacent to tide water, said bed having outer walls, the crest of which is higher than the water at high tide, of wings pointing in opposite directions and against one of which the water, in the movement of the tide in either direction, will strike, a dam toward which said wings converge, said dam filling the space between the converging ends of said wings and the wall, and being located at the inlet point in said wall, the crest of the dam being higher than the top of the wall adjacent to the water there being for each of said wings an inlet in said wall adapted to receive the water collected by said wing.

9. The combination with an oyster bed having outer walls and provided with interior or staggered walls, the outer wall having inlets, of wings, extending in different directions and respectively contiguous to said inlets, against one of which the water in the movement of the tide in either direction will strike.

10. In combination with an oyster bed adjacent to tide water, said bed having outer walls, the crest of which is higher than the water at high tide, and inlets in the outer wall contiguous to the water, of wings, pointing in opposite directions and against one of which the water, in the movement of the tide in either direction, will strike, one of said wings being adjacent to each of said inlets.

11. An oyster bed having outer walls, one portion thereof consisting of a reservoir and the other portion provided with interior or staggered walls.

12. An oyster bed having outer walls, one portion thereof consisting of a reservoir and the other portion provided with interior or staggered walls, there being inlets, from the reservoir, to the latter named part of the bed protected by screens, and outlets therefrom.

13. An oyster bed having outer walls, one portion thereof consisting of a reservoir and the other portion provided with interior or staggered walls, there being inlets, from the reservoir, to the latter named part of the bed protected by gates and screens, and outlets therefrom.

14. An oyster bed having outer walls, one portion thereof consisting of a reservoir and the other portion provided with interior or staggered walls, there being inlets, from the reservoir, to the latter named part of the bed and outlets therefrom, said inlets and outlets being protected by gates and screens.

15. An oyster bed having outer walls, one portion consisting of a reservoir and the other portion provided with interior staggered walls, there being passages between the compartments formed by said interior walls.

16. An oyster bed having outer walls, one portion consisting of a reservoir and the other portion provided with interior or staggered walls, there being passages between the compartments formed by said interior walls protected by gates.

17. The combination with an oyster bed having outer walls, of a wing, without but contiguous to one of said walls, for collecting the water.

In testimony of which invention I have hereunto set my hand.

DECATUR H. HIBBERT.

Witnesses:
PHILIP BOUTELJE,
M. FRANCES ELLIS.